C. C. MEYER.
FISHING ROD TIP END OR TOP.
APPLICATION FILED FEB. 3, 1913.
1,078,589.
Patented Nov. 11, 1913.
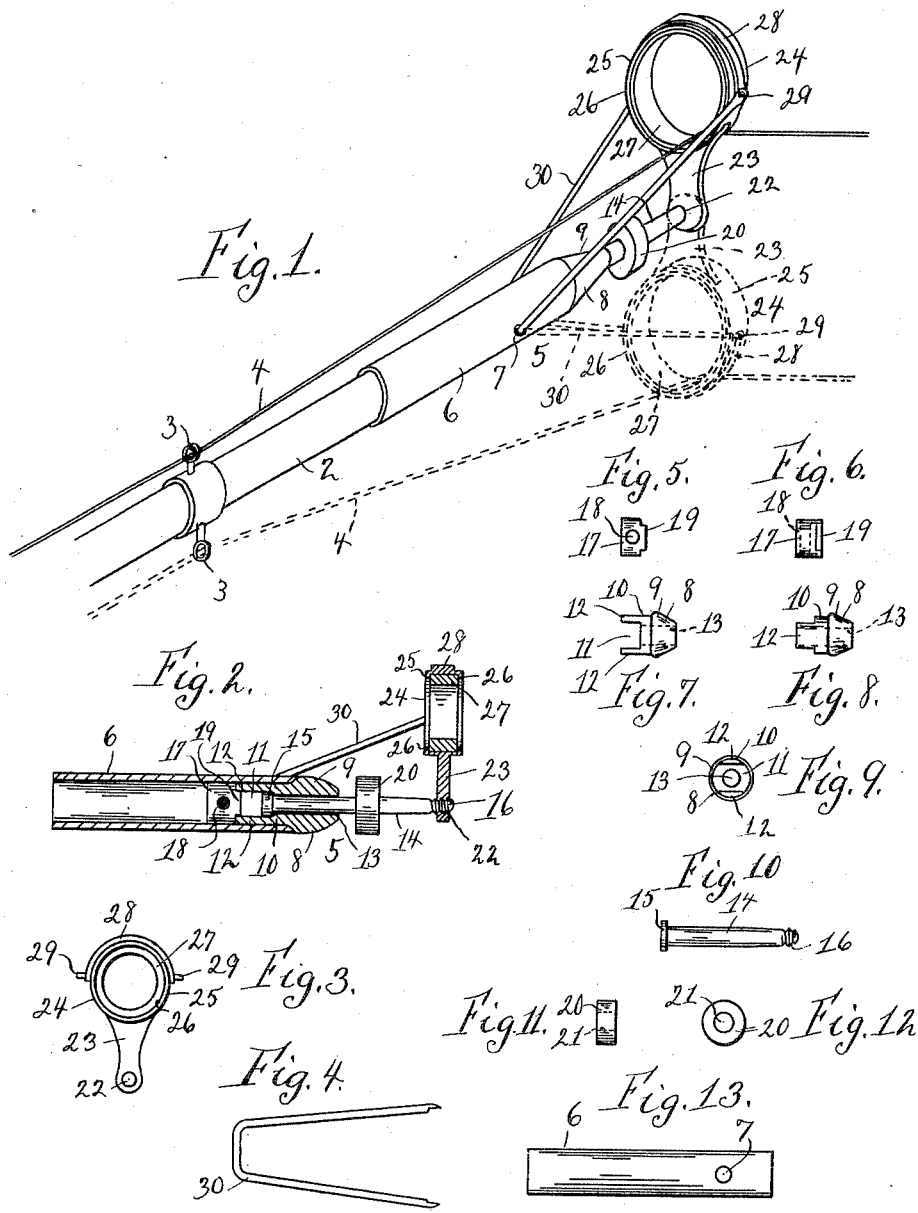
Witnesses
Inventor
Charles C. Meyer
By W. W. Williamson
Attorney

UNITED STATES PATENT OFFICE.

CHARLES C. MEYER, OF PHILADELPHIA, PENNSYLVANIA, ASSIGNOR TO LEWIS A. THOMPSON, OF ST. DAVIDS, DELAWARE.

FISHING-ROD TIP END OR TOP.

1,078,589.     Specification of Letters Patent.     Patented Nov. 11, 1913.

Application filed February 3, 1913. Serial No. 745,989.

*To all whom it may concern:*

Be it known that I, CHARLES C. MEYER, a citizen of the United States, residing at Philadelphia, in the county of Philadelphia and State of Pennsylvania, have invented new and useful Improvements in a Fishing-Rod Tip End or Top, of which the following is a specification.

My invention relates to new and useful improvements in a fishing rod tip end or top, and has for its object to provide a device of this character whereby the guide ring may be reversed thus permitting it to be used on either of two sides of the fishing rod and it may also be folded back along the rod to protect the guide ring when the fishing rod is not in use.

A further object of the invention is to provide a guide ring which will hold the fishing line out of contact with the end of the rod, overcoming the possibility of the line cutting or burring the tip end or top and rod, thereby preventing the line from becoming cut or frayed.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1, is a perspective view of my improved fishing rod, tip end or top, showing it applied to a fishing rod, and showing the two positions in which the guide ring may be placed. Fig. 2, a longitudinal sectional view thereof. Fig. 3, a face view of the guide ring. Fig. 4, a side elevation of the brace for holding the guide ring at right angles to the rod. Fig. 5, a side elevation of the cap which incloses the sliding pin. Fig. 6, a similar view at right angles thereto. Fig. 7, a side elevation of the nipple. Fig. 8, a similar view at right angles thereto. Fig. 9, an end view thereof. Fig. 10, a side elevation of the sliding pin. Fig. 11, a side elevation of the thumb piece. Fig. 12, a face view thereof, and Fig. 13, a side elevation of the sleeve.

In carrying out my invention as here embodied, 2 represents the fishing rod having guides 3, for guiding the fishing line 4 as in any ordinary fishing rod.

5 represents the tip end or top, consisting of a sleeve 6, cylindrical in shape and adapted to fit over the end of the fishing rod, said sleeve being provided with openings 7 to permit the passage of the brace as will be hereinafter described.

8 is the nipple, having a head 9, and a reduced portion or neck 10 having a portion 11 cut therefrom producing a pair of oppositely disposed arms 12. In this nipple is formed a central longitudinal opening or passage way 13, in which is mounted the sliding pin 14 having a head 15 and a threaded end 16. The head 15 prevents the withdrawal of the pin from the nipple and said head slides in the cut away portion or chamber 11, and said pin is limited in its inward movement by the cap 17 having a transverse opening 18 and a projection 19, on one face, which fits between the arms 12. The cap 17 is securely fastened to the arms of the nipple in any suitable manner and when the nipple is mounted in the end of the sleeve 6, the transverse opening 18 alines with the openings 7, in said sleeve.

20 represents the thumb piece having a central opening 21 permitting said thumb piece to be mounted upon the pin 14 and securely fastened thereto in any suitable manner, said thumb piece permitting the pin 14 to be readily revolved for threading the same into the threaded opening 22 formed in the depending arm 23, carried by the guide ring 24 which consists of a metallic ring 25, from the edges of which are formed the flanges 26, said flanges being used to retain the agate or other suitable composition ring 27 in position. The metallic ring 25 carries a rib 28 in which are mounted the pivot pins 29 on which are journaled the ends of the brace 30, said brace being preferably in the form of a staple which passes through the openings 7 in the sleeve and openings 18 in the cap, thus swingingly attaching the brace to the sleeve 6.

In practice, the guide ring 24 is raised until it is at right angles to the fishing rod and the pin 14 threaded into the opening 22. The threaded end of the pin 14 is of sufficient length to be threaded into the opening 22 until the head 15 of the pin comes in contact with the wall of the nipple 8, thus drawing the depending arm 23 of the guide ring and the nipple toward one another which will firmly hold the guide ring in an upright position. In the better class of fishing rods, the rod is provided with two sets of guides, so that after the rod begins to bend in one direction, the other side may be used, thus again straightening the rod and when the outer side is to be used, it is necessary to reverse the guide ring 24 which may be done by unscrewing the pin 14 from the opening in the depending arm 23 then swinging the guide ring to the opposite side on the fulcrum of the brace at the openings 7 and then reversing the guide ring in the brace on the fulcrum of the pins 29 after which time the pin 14 may be again threaded into the opening 22 in the depending arm 23. The guide ring being out of alinement with the face of the rod, the fishing line 4 will be removed from the rod especially the end thereof, and will prevent the line from coming in contact therewith and overcoming any possibility of the rod, or tip end or top being burred or the line being cut or frayed.

Of course I do not wish to be limited to the exact details of construction as here described, as these may be varied within the limits of the appended claims without departing from the spirit of my invention.

Having thus fully described my invention, what I claim as new and useful, is—

1. A fishing rod tip end or top, comprising a guide ring, means for adjustably attaching said guide ring to the fishing rod and a brace swingingly carried by said means and pivoted to the guide ring whereby said guide ring may be adjusted to different positions.

2. In a fishing rod tip end or top, a sleeve, a guide ring, a brace swingingly mounted in the sleeve and pivoted to the guide ring and means slidably mounted in the sleeve adapted to engage the guide ring for holding the same in an upright position.

3. In a fishing rod tip end or top, a sleeve, a guide ring, a brace swingingly mounted in the sleeve and pivoted to the guide ring, a depending arm carried by the guide ring and a sliding pin carried by the sleeve adapted to engage the depending arm for holding the guide ring in an upright position.

4. In a fishing rod tip end or top, a sleeve having openings therein, a nipple having a central longitudinal opening, said nipple being reduced in size to form a neck, said neck having a chamber cut therefrom forming a pair of oppositely disposed arms, a cap having a transverse opening therein and provided with a projection, said cap being carried by the nipple, the projection lying between the arms, the transverse opening in said cap alining with the openings in the sleeve, a pin provided with a head and having one end threaded, slidably mounted in the nipple, a thumb piece mounted upon said pin, a guide ring consisting of a metallic ring provided with a rib having an arm depending therefrom in which is formed a threaded opening, pivot pins carried by the metallic ring and an agate or other suitable composition ring, said agate or other suitable composition ring being mounted in the first named ring, a brace passing through the openings in the sleeve, and cap, and having its end pivoted to the guide ring in an upright position, said guide ring being so attached to the brace that it may be swung to either of two sides of the rod, or folded back on the rod when not in use, thus protecting it from injury.

In testimony whereof, I have hereunto affixed my signature in the presence of two subscribing witnesses.

CHAS. C. MEYER. [L. S.]

Witnesses:
T. FOSTER THOMAS,
LEONARD W. BELZ.

---

Copies of this patent may be obtained for five cents each, by addressing the "Commissioner of Patents, Washington, D. C."